Nov. 3, 1964  R. H. BETER ETAL  3,155,962
SYSTEM FOR REPRESENTING A TIME INTERVAL BY A CODED SIGNAL
Original Filed May 23, 1955
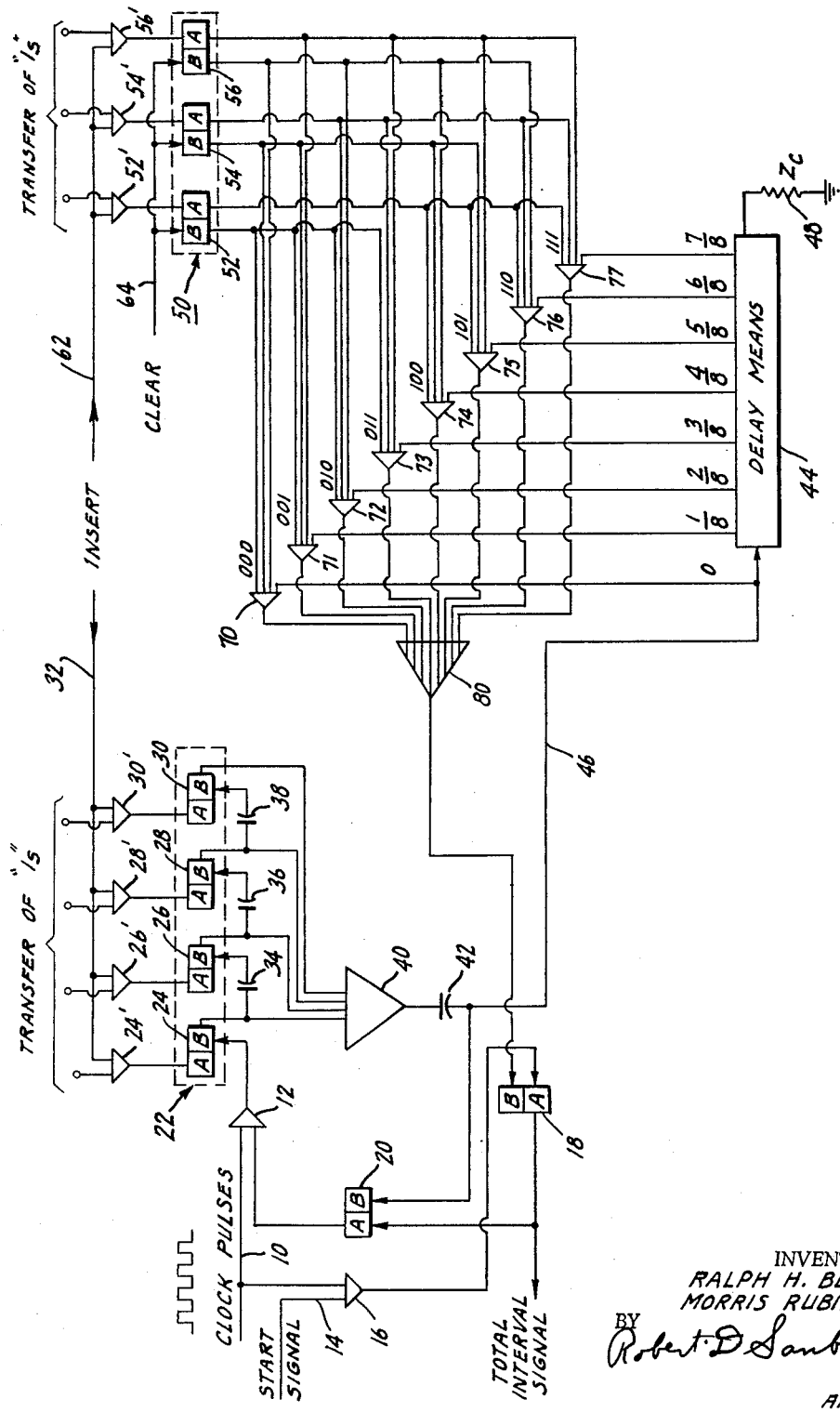
INVENTORS
RALPH H. BETER
MORRIS RUBINOFF
BY
Robert D. Sanborn
ATTORNEY

United States Patent Office 3,155,962
Patented Nov. 3, 1964

3,155,962
SYSTEM FOR REPRESENTING A TIME
INTERVAL BY A CODED SIGNAL
Ralph H. Beter, Philadelphia, and Morris Rubinoff, Sharon Hill, Pa., assignors, by mesne assignments, to Philco Corporation, Philadelphia, Pa., a corporation of Delaware
Original application May 23, 1955, Ser. No. 510,172, now Patent No. 2,888,647, dated May 26, 1959. Divided and this application Mar. 12, 1959, Ser. No. 799,026
7 Claims. (Cl. 340—353)

This application is a division of our copending application Serial No. 510,172, filed May 23, 1955, now Patent No. 2,888,647.

The present invention relates to computer systems and more particularly to systems for generating signals having a time duration equal to the time interval represented by a series of coded electrical signals.

In many computer systems, and in computer components of other systems such as radar systems, it is frequently necessary or desirable to represent information in different forms for different purposes. For example, information may be accumulated as the time duration of various electrical signals, processed as a coded sequence of electrical impulses, and utilized as the time duration of other electrical signals. Obviously means must be provided for converting between the electrical signals representing information by their time duration and coded groups of electrical signals representing the same information but in a different form.

One method which has been employed in the past, of representing the time duration of a signal by a coded group of signals, includes the steps of establishing a clocking pulse source which produces a series of equi-spaced clocking pulses, supplying these clocking pulses and the information bearing signal to a coincidence circuit which passes the clocking pulses only during the interval represented by the second signal, and then supplying the clocking pulses passed by the coincidence circuit to a counting circuit which produces the desired coded signal.

Coded signals have been converted to signals of indicated time duration by first presetting the code in a suitable register or counting circuit. The counting circuit is arranged to count the pulses supplied thereto and to provide an indication when the number of clocking pulses counted thereby is equal to the number represented by the preset code. The interval between the first clocking pulse supplied to the register or counting circuit and the time of occurrence of the above-mentioned indication is the time interval represented by the code. In some systems a bi-stable circuit may be triggered to one stable state by the first clocking pulse and then returned to its initial stable state upon the occurrence of the above-mentioned indication. The signal supplied by this bi-stable circuit is an electrical signal having a duration equal to the time duration represented by the code. These prior art circuits have the disadvantage that the unit employed in measuring or generating a signal is one period of the clocking signal. Generally fractions of a period are disregarded both in the measuring operation and in the generating operation. For example, if the repetition rate of the clocking signal is chosen to be one megacycle per second, the measuring circuit will indicate how many one-microsecond intervals are contained in the signal to be measured. Fractions of a period generally are not registered. Furthermore, it is often necessary to provide suitable phasing means to cause the initial portion of the signal to be measured to occur in time coincidence with a clocking pulse. Similarly the duration of signals generated by a system controlled by a one-megacycle clocking signal can be increased in steps of one microsecond but not by fractions of a microsecond.

Greater precision can be achieved by increasing the frequency of the clocking signal. However, it is not always convenient or practical to use a high frequency clocking signal. For example, if a time interval of 103.4 microseconds is to be measured with a clocking signal having a frequency of one megacycle, the counter or register need only be capable of counting approximately 104 signals. If a 10 megacycle clocking frequency is employed, the counter would be required to register the number 1,034. This would require several additional registers if the computer employs a binary code. The use of the higher clocking frequency has the added disadvantage that, while only a very small part of the computer system may require the higher precision afforded by the higher clocking frequency, the entire computer may have to be arranged to handle the higher frequency.

Therefore it is an object of the present invention to provide a novel system which will generate signals representing time intervals with greater precision than systems heretofore known in the art.

It is a further object of the invention to provide a novel system that employs reference intervals of two different durations in generating a signal.

It is a further object of the invention to provide a novel system which will generate a signal to a precision which is a preselected fraction of the basic measuring interval of the system.

Another object of the present invention is to provide a novel system for converting between a digital code and an electrical signal having a time duration which may be represented by the digital code.

In general, these and other objects of the invention are accomplished by providing a system which employs a relatively low clocking frequency. In generating the signal, the number of basic intervals and the number of subdivided periods to be included in the final output signal are represented by separate parts of the coded signal. A suitable timing device turns on a signal generating circuit for the interval representing the number of basic intervals to be included in the output signal and then energizes a vernier circuit which turns off the signal generating circuit after the indicated number of subdivided intervals have elapsed.

For a better understanding of the invention together with other and further objects thereof reference should now be made to the following detailed description which is to be read in conjunction with the accompanying drawings in which:

The single figure is a diagram, partly in block form, showing a preferred embodiment of the invention which will convert a digital code to an electrical signal having a duration represented by the code.

In the drawing clock pulses are supplied over a lead 10 to an "and" gate 12. An "and" gate is a form of coincidence circuit or gate circuit which will generate an output signal only in response to a preselected signal on all input leads. A start signal is supplied by way of lead 14 to a second "and" gate 16 which also receives clock pulses from lead 10. The output of "and" gate 16 is supplied to the A side of a bi-stable circuit 18. The letters A and B are used in the drawing to represent the two halves of the bi-stable circuits. However, it should be remembered that the two halves of a bi-stable circuit are in many cases identical in their construction. The connection from "and" gate 16 to circuit 18 is such that circuit 18 is caused to change from one stable state $b$ to the other state $a$ upon the occurrence of a signal at the output of gate circuit 16. The output of "and" gate 16 is supplied also to the A half of a second bi-stable circuit 20. This connection is made in such a manner that circuit 20 changes from one stable state $b$ to the other state $a$ at the same time that circuit 18 changes to the state $a$.

In the embodiment of FIG. 1 this is accomplished by connecting the output of the A side of bi-stable circuit 18 to the A side of bi-stable circuit 20. In other embodiments of the invention a direct connection may be made from the output of gate circuit 16 to the input of the A side of multivibrator 20. Bi-stable circuits 18 and 20 may be the well known Eccles-Jordan circuits or any bi-stable circuits equivalent thereto. The connections required to cause two such circuits to operate together are well known to those skilled in the art. The output of circuit 20 is supplied to a second input of "and" gate 12. The output of "and" gate 12 is supplied to an input of a register 22 composed of bi-stable circuits 24, 26, 28 and 30. Register 22 is of conventional design and has a capacity of four binary digits. The invention is not to be limited to counts of a magnitude that can be represented by four binary digits. Registers employing more or fewer elements than register 22 may be employed. Furthermore, number systems other than binary may be accommodated if appropriate storage and counting techniques are used. "And" gates 24', 26', 28' and 30' are provided as a means for transferring information from an external source, for example a section of a computer, to register 22. The register 22 is arranged for the simultaneous transfer of information to each of the four elements 24, 26, 28 and 30 at a time preceding the start signal, determined by a signal supplied by way of lead 32. The method or sequence for transferring information into register 22 is not a concern of this invention; therefore parallel transfer has been described only as an example. Capacitors 34, 36 and 38 in register 22 indicates one method for transferring information from one unit of the register to the next when the register is responding to clock pulses, but not when it is responding to signals supplied by way of gates 24', 26', 28' and 30'. Connections are made from units 24, 26, 28 and 30, respectively, to four inputs of an "and" gate 40. As suggested above, a predetermined signal is required on all four inputs of "and" gate 40 before an output signal is generated. The output of "and" gate 40 is supplied through capacitor 42 to a second input of bi-stable circuit 20 and to the input of delay means 44. Any type of counter circuit that can be set to count out any given number of steps is suitable for use in register 22. As shown in the drawing, register 22 is presumed to end its count at zero so that it is not necessary to clear the register before reuse.

Delay means 44 is provided with a series of output taps which are so arranged that a signal supplied to input lead 46 will appear at the output leads in succession. Preferably the delay between any two adjacent taps is a preselected fraction of the total delay of delay means 44. In the example chosen for illustration in the drawing, the delay between adjacent taps is made equal to 1/8 of the total delay. The total usable delay of delay means 44 is equal to one clocking pulse period minus one of the preselected fractions of that period. Therefore, it would be possible to terminate the delay line at the 7/8 tap in the drawing. Delay means 44 may be a section of transmission line provided with taps at appropriate intervals, a series of sections of artificial transmission line composed of inductors and capacitors, or a series of any convenient form of delay stage employing only passive circuit elements or passive and active circuit elements. A resistor 48 is provided for terminating delay means 44 in its characteristic impedance to insure that negligible reflection of the delayed pulse will occur.

A second register 50, including units 52, 54 and 56, is provided for controlling the vernier portion of the system shown in the drawing. Register 50 is similar to register 22 except that the capacitors which couple adjacent units in register 22 are not found in register 50. That is, register 50 need not be equipped to perform counting because it is used only for static storage. "And" circuits 52', 54' and 56' are provided to permit transfer of information into vernier register 50. Again, the method or sequence of transferring information into register 50 is not the concern of this invention and parallel transfer has been described only by way of example. The time at which the information is transferred may coincide with that of the signal on lead 32, but in any case precedes the signal on lead 46, and is controlled by an insert signal supplied by way of lead 62. A second input connection 64, which is common to all units of register 50, may be provided for clearing the register of previously stored information. Register 50 and the several taps on delay means 44 are interconnected by a series of "and" gates 70-77 inclusive, the final digit of each reference numeral corresponding to the number of 1/8 delay represented by the tap with which it is associated. For example, "and" gate 73 is associated with the 3/8 tap on delay means 44. The B half of bi-stable unit 52 is connected to "and" gates 70-73 inclusive. The A half of unit 52 is connected to "and" gates 74 through 77 inclusive. Similarly the B half of unit 54 is connected to "and" gates 70, 71, 74 and 75, while the A half of unit 54 is connected to "and" gates 72, 73, 76 and 77. The B half of unit 56 is connected to "and" gates 70, 72, 74 and 76, and the A half is connected to the odd numbered gates 71, 73, 75 and 77. It should be noted that each of the "and" gates is connected to one side or the other of each of the three units 52, 54 and 56 in register 50. Although in the drawing the inputs to gates 70-77 inclusive are connected to bi-stable circuits 52, 54 and 56 according to a binary code, other codes may be used instead.

The outputs of all the "and" gates 70-77 inclusive are connected to the several inputs of "or" gate 80. An "or" gate is a circuit which will provide an output signal if an input signal appears at any one or more than one of several inputs.

The output of "or" gate 80 is connected to a second input of bi-stable circuit 18. The connection from "or" gate 80 to circuit 18 is such that circuit 18 is returned to the stable state b which existed prior to the application of the signal from "and" gate 16. The output signal of the circuit shown in the drawing is taken from bi-stable circuit 18. This output signal will have the form of a rectangular voltage wave having a duration determined by the information set into main register 22 and vernier register 50.

The circuit shown in the drawing is arranged to generate an electrical signal having a duration equal to that represented by a code impressed on registers 22 and 50. Register 22 indicates the number of whole periods of the clocking pulse contained in the signal to be generated. Vernier register 50 indicates the number of the fractions of the clocking pulse period which are to be included in the generated interval. Normally register 22 will have been cleared of all stored information by a previous operation of the circuit, although a means to clear may be provided if desired, for example when first turned on. However, register 50 will have information from a previous operation stored therein. Therefore it is necessary to clear register 50 before initiating each operation of the circuit. The register 50 is cleared by supplying a signal over lead 64 which sets units 52, 54 and 56 so that the output of the B half of each circuit is effective. The output of the A half of each of these three circuits will then be ineffective. In other words, the units 52, 54 and 56 will all be in state b. This condition represents zero stored information. In register 22, units 24, 26, 28 and 30 will also be in state b, with the B half of each unit effective and the A half ineffective. By supplying a gating pulse to lead 32, signals will appear at the A halves of units 24, 26, 28 and 30 through gates 24', 26', 28' and 30', respectively, only if a "one" signal is transferred from the suitable external circuit to the associated inputs of gates 24', 26', 28' and 30'. For example, a signal will appear at the A half of unit 24 if and only if a "one" signal appears at the one input to gate 24′ at the same time that the gating pulse on lead 32 is applied to the other input of gate 24′. Since a signal appearing at the A half of unit 24 sets unit 24 into its *a* state, and similarly for units 26, 28 and 30, the result of applying a gating pulse to lead 32 is the transfer of the information from the external circuit into register 22, which is capable of registering any number of units up to sixteen. By applying a gating pulse to lead 62, vernier information is transferred in a similar manner into register 50, which can register any number of fractions up to eight.

The system shown in the drawing operates in the following manner. The start signal and the clock pulses are supplied by way of inputs 10 and 14 to "and" gate 16. An output signal will be generated by "and" gate 16 for the clock pulse which coincides with the start signal. Ideally the start signal should have a value just slightly greater than the interval between the trailing edge of one clock pulse and the leading edge of the next. If the start signal is of shorter duration, it is possible that no coincidence will occur between the start signal and a clock pulse. If it is of longer duration, two clock pulses will coincide with the start signal. This will result in two signals being supplied to the A side of bi-stable circuit 18 from "and" gate 16. The application of two "start" signals to this circuit will be a disadvantage only if the interval to be measured is less than one clock pulse period in duration. The connection to bi-stable circuit 18 may be such that this circuit responds only to the first received pulse and is insensitive to further pulses applied to the same point until after a signal has been supplied to the B side of the circuit. If it is expected that intervals of less than one clock pulse period in duration may be encountered the second pulse may be eliminated by connecting the output of "and" gate 16 back to the input through a delay line having a delay equal to one pulse period. The connection should be such that the second pulse is inhibited by the delayed first pulse. The signal from "and" gate 16 causes the bi-stable circuit 18 to change from one stable state to the other. It will be assumed that the output signal of the A half of the bi-stable circuit 18 was low before the application of the signal from "and" gate 16 and becomes high upon application of this signal. The signal from "and" gate 16 also causes bi-stable circuit 20 to change from stable state *b* to the other state *a*. Again it will be assumed that the output of the A half of bi-stable circuit 20 was low or ineffective before the application of the signal from "and" gate 16 and becomes high or effective upon the application of this signal. The output of bi-stable circuit 20 and the clocking pulses mentioned above are supplied to the inputs of "and" gate 12.

The first clock pulse passing "and" gate 16 also passes "and" gate 12 and causes unit 24 of register 22 to change its state thus subtracting unity from the number in register 22. Suppose this change is in such a direction as to have no effect on unit 26, corresponding to a change from "one" to "zero" in unit 24. The second clock pulse passing "and" gate 12 will cause unit 24 to return to its initial "one" or high state. This second change will be in a direction to cause unit 26 to change its state because of the signal supplied thereto through capacitor 34. Suppose that this change has no effect on unit 28. Then the second change of state of unit 26 will cause unit 28 to change its state. Those familiar with registers of this type will recognize that the application of a number of clock pulses corresponding to the number represented by the information originally supplied to register 22 will reset register 22 so that the output signal from the B halves of all four units is high. The high output signal from the four units of register 22 will cause "and" gate 40 to produce an output signal. This output signal changes the state of bi-stable circuit 20 and prevents the further application of clock pulses to register 22. The output signal of "and" gate 40 is also supplied to the input of delay means 44. The initial setting of register 50 will have conditioned one of "and" gates 70 through 77 to pass a signal upon the occurrence of a signal at a corresponding tap on delay means 44. For example, if registers 52 and 54 are set so that the A halves of these two units are at high potential and unit 56 is set so that the B half is at high potential, "and" gate 76 will be conditioned to pass a signal upon the occurrence of a signal at the ⅝ tap of delay means 44. All of the other "and" circuits will have one or more input leads at a low potential so that they will not pass a signal even though it appears at the corresponding tap on delay means 44. In the example chosen above, the output signal of "and" gate 40 will pass down delay means 44 without affecting any of the "and" gates 70 through 77 until it reaches the ⅝ tap on delay means 44. Upon the appearance of the signal at the ⅝ tap, "and" gate 76 will generate an output signal which will be passed by "or" gate 80. The signal from "or" gate 80 will change bi-stable circuit 18 to its original stable state *b*. The signal appearing at the output lead shown will have the form of a rectangular pulse which has a leading edge corresponding in time to the first change in stable state of circuit 18, and a trailing edge corresponding in time to the second change in state of circuit 18 brought about by the signal supplied by "or" circuit 80. The number of whole clock pulse periods contained in this rectangular pulse will correspond to the number represented by the code originally impressed on register 22 and the number of additional ⅛ periods of the clock pulse contained in the rectangular pulse will correspond to the number represented by the code impressed on register 50.

The system shown in the drawing is arranged to respond to information in binary code form. However, it will be obvious to those familiar with computer circuits that the system may be arranged to operate with other number systems such as the decimal system or a progressive or cyclic code, for example the so-called Gray code.

In describing the operation of the system shown in the drawing it has been assumed that the various "and" gates and "or" gates provide output signals in the form of positive pulses and that the bi-stable circuits effect the operation of other circuits associated therewith when the signal supplied thereby goes from a low potential to a high potential. It should be understood that the invention is not to be limited to this choice of signal polarities. Inverters and circuits responsive to negative pulses may be used whenever this is found to be convenient.

While the invention has been described with reference to a single embodiment thereof, it will be apparent that various modifications and other embodiments thereof will occur to those skilled in the art within the scope of the invention. Accordingly we desire the scope of our invention to be limited only by the appended claims.

What is claimed is:

1. A circuit for generating a signal having a time duration equal to that represented by a coded control signal comprising first register means for providing electrical potentials arranged to represent the first part of a two part digital code, second register means for providing electrical potentials arranged to represent the second part of a two part digital code, the first part of said code representing the number of integral reference intervals and the second part representing the number of fractional reference intervals to be included in said generated signal, a signal generating circuit arranged to be rendered operative by a first signal and further arranged to be rendered inoperative by a second signal, a source of periodic clocking signals, means connecting said source to said signal generating circuit, said last-mentioned means being arranged to permit the passage of only one of said clocking signals, counting means including said first register means and responsive to said clocking signals for generating a signal upon the reception by said counting means of the number of clocking signals represented by said first part of said code, vernier circuit means responsive to the signal generated by said counting means for providing a plurality of signals spaced apart by a fraction of a period of said clocking signals, means responsive to the outputs of said second register means and said vernier circuit means for supplying to said signal generating circuit the one of said plurality of signals spaced from said signal initially supplied to said vernier circuit means by a number of fractional periods represented by said second part of said code.

2. A circuit for generating a signal having a time duration equal to that represented by a two part digital code, the first part of said code representing the number of integral reference intervals and the second part representing the number of fractional reference intervals to be included in said generated signal, said circuit comprising a first register which may be preset to indicate said first part of said code, means for presetting said first register to indicate said first part of said code, a second register which may be preset to indicate said second part of said code, means for presetting said second register to indicate said second part of said code, a signal generating circuit, means for supplying a single clocking signal to said signal generating circuit to initiate the operation thereof, means for supplying said last-mentioned clocking pulse and succeeding clocking pulses to said first register, said first register being arranged to provide an output signal upon the application of a number of clocking signals determined by the condition to which said first register is preset, circuit means responsive to said signal generated by said first register for providing a plurality of signals spaced apart by a fraction of a period of said clocking signals, coincidence means controlled by said second register and arranged to supply a selected one of said plurality of signals to said signal generating circuit to terminate the operation thereof, said selected signal being determined by the condition to which said second register is preset.

3. A circuit for generating a signal having a time duration equal to that represented by a two part digital code, a first part of said code representing the number of integral reference intervals and a second part of said code representing the number of fractional reference intervals to be included in said generated signal, said circuit comprising a source of a start signal, a source of clock pulses, a first bi-stable circuit, first coincidence means coupling said source of clock pulses and said source of a start signal to a first side of said first bi-stable circuit, a second bi-stable circuit, said first side of said first bi-stable circuit being connected to a first side of said second bi-stable circuit, a plurality of additional bi-stable circuits, capacitor means coupling said additional plurality of bi-stable circuits in series to form a counting register, second coincidence means connecting said source of clock pulses and said second bi-stable circuit to the first of said additional plurality of bi-stable circuits, means for presetting said additional plurality of bi-stable circuits in accordance with said first portion of said code, third coincidence means coupled to the outputs of said additional plurality of bi-stable circuits, means connecting the output of said third coincidence means to said second bi-stable circuit for restoring said second bi-stable circuit to its initial condition, a tapped delay means having $n-1$ equally spaced taps, where $n$ is an integer greater than 1, the delay time between adjacent taps being $T/n$ where T is a period of the clocking signal, means coupling the output of said third coincidence means to the input of said tapped delay means, a plurality of additional coincidence circuits, one of said last-mentioned additional coincidence circuits being associated with each of said taps, a second plurality of bi-stable circuits, said second plurality of bistable circuits forming, in combination, a second register on which said second part of said code may be impressed, means for impressing said second part of said code on said second register, means connecting said second plurality of bi-stable circuits to said plurality of additional coincidence circuits, said connecting means being so arranged that a single one of said additional plurality of coincidence circuits is conditioned to pass signals appearing at said taps of said delay means for each preset condition of said second register, means connecting the outputs of said plurality of additional coincidence circuits to a second half of said first bi-stable circuit, said first bi-stable circuit being arranged to be restored to its initial condition upon the application of a signal from any one of said plurality of additional coincidence circuits.

4. A circuit for generating a signal having a time duration equal to that represented by a two part digital code, a first part of said code representing the number of integral reference intervals and a second part of the code representing the number of fractional reference intervals to be included in said generated signal, said circuit comprising first register means which may be preset to indicate said first part of said code, means for presetting said first register means to indicate said first part of said code, second register means which may be preset to register said second part of said code, means for presetting said second register means to indicate said second part of said code, a signal generating circuit, means for supplying a single clocking pulse signal to said signal generating circuit to initiate the operation thereof, means for supplying clocking pulse signals to said first register means during the interval that said signal generating circuit is operative, said first register means being arranged to provide an output signal upon the application of a number of clocking signals determined by the condition to which said first register means is preset, a tapped delay means having a plurality of output taps, the delay between adjacent output taps being a preselected fraction of a period of said clocking signal, means coupling the output of said first register means to the input of said tapped delay means, means controlled by said second register means for connecting a selected one of said output taps to said signal generating circuit, the selection of said tap being determined by the condition to which said second register means is preset, said signal generating circuit being so constructed and arranged that the operation thereof is terminated by a signal from said tapped delay means.

5. A circuit for generating a signal having a time duration equal to that represented by a two part digital code, a first part of said code representing the number of integral reference intervals and a second part of the code representing the number of fractional reference intervals to be included in said generated signal, said circuit comprising first register means which may be preset to indicate said first part of said code, means for presetting said first register means to indicate said first part of said code, second register means which may be preset to register said second part of said code, means for presetting said second register means to indicate said second part of said code, said second register means comprising a plurality of bi-stable elements, a signal generating circuit, a source of clocking pulses, means coupled to said source of clocking pulses for supplying a single clocking pulse to said signal generating circuit to initiate the operation thereof, means jointly responsive to the output of said signal generating circuit and the output of said source of clocking pulses for supplying clocking pulses to said first register means during the interval that said signal generating circuit is operative, said first register means being arranged to provide an output signal upon the application of a number of clocking pulses determined by the condition to which said first register means is preset, a tapped delay means having $n-1$ equally spaced taps, where $n$ is an integer greater than 1, the delay time between adjacent taps being $T/n$, where T is a period of the clocking pulses, means coupling the output of said first register means to the input of said tapped delay means, a coincidence circuit coupled to each of said taps, means connecting said coincidence circuits to said bi-stable elements of said second register means, said connecting means being so arranged that a single coincidence circuit is conditioned to pass signals occurring at said taps of said tapped delay means for each preset condition of said register means, means coupling the output of said coincidence circuits to said signal generating circuit, said signal generating circuit being so constructed and arranged that the operation thereof is terminated by a signal from any one of said coincidence circuits.

6. A circuit for generating a signal having a time duration equal to that represented by a two part digital code, a first part of said code representing the number of integral reference intervals and a second part of said code representing the number of fractional reference intervals to be included in said generated signal, said circuit comprising first register means which may be preset to indicate said first part of said code, means for presetting said first register means to indicate said first part of said code, second register means which may be preset to register said second part of said code, said second register means comprising a plurality of bi-stable elements, means for presetting said second register means to indicate said second part of said code, a signal generator circuit, a source of start signals, a source of clock signals, coincidence means coupling said source of start signals and said source of clock pulses to said signal generator circuit, a control signal generator associated with said signal generator circuit, said control signal generator being arranged to be energized simultaneously with the energization of said signal generator circuit, second coincidence means coupled to said source of clock pulses and said control signal generator, said second coincidence means being arranged to permit said clock pulses to be supplied to said first register means on the occurrence of a signal at the output of said control signal generator, said first register means being arranged to provide an output signal upon the application of a number of clocking pulses determined by the preset condition of said first register means, means connecting the output of said first register means to said control signal generator to terminate the operation thereof, a tapped delay line having $n-1$ equally spaced taps, where $n$ is an integer greater than 1, the delay time between adjacent taps being $T/n$, where T is the period of the clocking pulse signal, means coupling the output of said first register means to an input of said tapped delay line, additional coincidence circuit means coupled to each of said taps, means connecting said additional coincidence circuit means to said bi-stable elements of said second register means, said connecting means being so arranged that a single one of said additional coincident circuit means is conditioned to pass signals occurring at said taps of said tapped delay line for each preset condition of said second register means, "or" gate means coupled to the output of said additional coincidence circuit means, said "or gate means providing an output signal in response to a signal from any one of said additional coincidence circuit means, means coupling the output of said "or gate means to said signal generator circuit, said signal generator circuit being so constructed and arranged that the operation thereof is terminated by a signal from said "or" gate means.

7. Means for generating a signal of a preselected time duration comprising a signal generating circuit, first timing means, means for initiating simultaneously the operation of said signal generating circuit and said first timing means, said first timing means providing an output signal at a time after the initiation of the operation thereof equal to a preselected number of integral reference intervals, second timing means responsive to the output signal of said first timing means, said second timing means providing signals at intervals equal to a fractional part of one of said reference intervals, means responsive to said signals provided by said second timing means for terminating the operation of said signal generating circuit after the lapse of a preselected number of fractional parts of said reference intervals.

References Cited in the file of this patent
UNITED STATES PATENTS

| | | |
|---|---|---|
| 2,403,561 | Smith | July 9, 1946 |
| 2,403,873 | Mumma | July 9, 1946 |
| 2,710,958 | Sallach | June 14, 1955 |
| 2,842,662 | Williams | July 8, 1958 |
| 2,844,790 | Thompson et al. | July 22, 1958 |
| 2,846,142 | Strachey | Aug. 5, 1958 |
| 2,853,235 | Brinster et al. | Sept. 23, 1958 |
| 2,908,892 | Lanning | Oct. 13, 1959 |

OTHER REFERENCES

"Recorder and Timer for Short Intervals" (Bliss), Electronics, November 1947 (pages 126–127 relied on).